United States Patent [19]

Kwiatkowski et al.

[11] 4,165,975
[45] Aug. 28, 1979

[54] GOB WEIGHING SYSTEM

[75] Inventors: Jerome A. Kwiatkowski; Charles L. Wood, both of Muncie, Ind.

[73] Assignee: Ball Corporation, Muncie, Ind.

[21] Appl. No.: 898,210

[22] Filed: Apr. 20, 1978

[51] Int. Cl.² ............................................. C03B 9/40
[52] U.S. Cl. ........................................ 65/29; 65/158; 65/164; 65/DIG. 13; 177/1; 177/16; 364/566; 364/567
[58] Field of Search ........... 65/29, 163, 164, DIG. 13, 65/158; 177/25, 50, 16, 1, 145; 364/566, 567

[56] References Cited

U.S. PATENT DOCUMENTS

| | | | |
|---|---|---|---|
| 1,820,508 | 8/1931 | Sylvester | 65/164 |
| 1,851,215 | 3/1932 | Schunemann | 356/20 |
| 1,898,705 | 2/1933 | Wood et al. | 65/164 |
| 1,941,552 | 11/1934 | Henry et al. | 65/164 |
| 2,010,777 | 8/1935 | Grotta | 65/164 |
| 2,455,532 | 12/1948 | Sunstein | 250/201 |
| 3,182,737 | 5/1965 | Monsees | 177/50 X |
| 3,278,747 | 10/1966 | Ohmart | 177/16 X |
| 3,443,651 | 5/1969 | White | 177/116 |

Primary Examiner—Arthur D. Kellogg
Attorney, Agent, or Firm—J. David Haynes

[57] ABSTRACT

A system is disclosed for determining the mass of a moving molten glass gob. The gob is directed along a curved channel having a force measuring device over which the gob passes for measuring the force exerted by the gob normal to its path. The velocity of the gob is determined both before and after the normal force is measured by means of two sets of two position sensors, one set located on each side of the force measuring device, and a timer which determines the time period for the gob to move between the position sensors of each set. The timer also determines the time between velocity measurements. The data is used to calculate a value of acceleration which is substantially proportional to the acceleration normal to the path. The acceleration value and the output of the force measuring device are then interrelated in order to calculate the mass of the gob.

13 Claims, 3 Drawing Figures

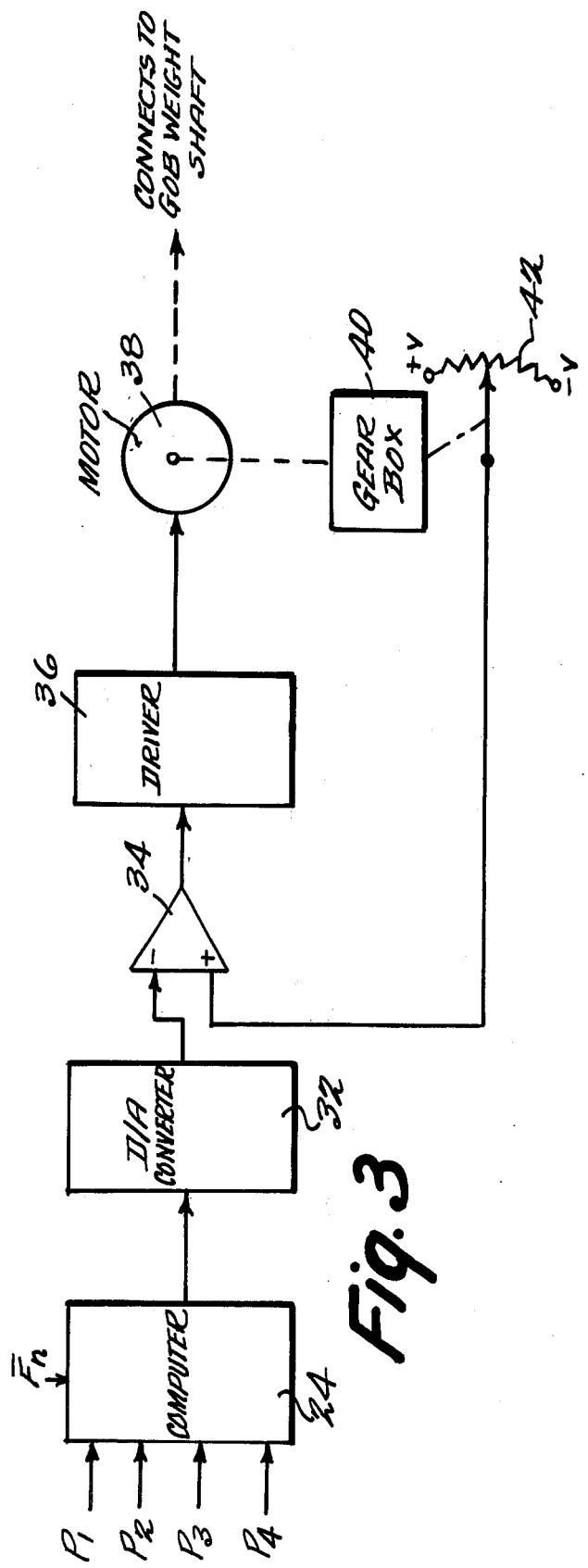
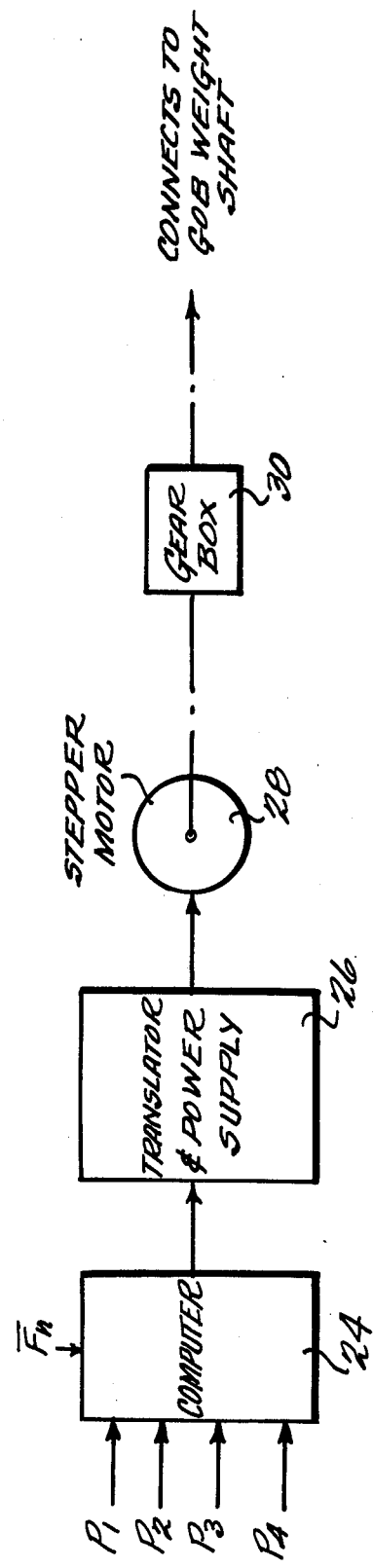

GOB WEIGHING SYSTEM

The present invention relates to apparatus and method for determining the weight of a moving object, and more specifically relates to method wherein the acceleration of an object and the force exerted as a result of that acceleration are used to determine its mass.

Many applications require the measurement of mass while an object is moving. An example of this is the measurement of the mass of a molten gob of glass which is about to be inserted into a glass making machine. In the typical glassware forming process, a source of molten glass produces the input for the glassware forming machine. As the molten glass flows out of the source, cutter blades form gobs of molten glass which fall a short distance through the air and enter either a scoop or a gob distributor which routes the gob to the proper section of the glassware forming machine for conversion into a glass bottle. The amount of glass that is cut off in each stroke of the cutter blade is a function of the flow rate out of the source, which in turn is a function of viscosity and, therefore, the glass temperature. The temperature is controlled in the source, but temperature variations still occur.

In the typical molten glass source, a plunger is centered over a bowel orifice. The orifice size is selected and the plunger stroke is adjusted to allow a predetermined rate of flow of glass at a certain temperature (viscosity) to discharge from the orifice per unit time. The plunger oscillates in synchronism with the cutter blades.

To compensate for small changes in viscosity, which in turn changes the flow rate and therefore the gob weight, a change can be made in the plunger stroke length. This is accomplished by turning a shaft which is geared to the plunger mechanism and extends to the shop floor for access by the machine operator.

In the past, the operator periodically weighed a bottle to determine if it met specification, that is, if the amount of glass is correct. Since the molds in which the bottles are formed are of constant size, the amount of glass that is used to form each bottle determines its capacity. One characteristic of high quality glassware is that it is of predictable volume. However, if the amount of glass used to form the bottle is low, the bottle will be thinner than is acceptable, because less glass is available to be distributed in a bottle of fixed outer dimensions. Therefore, to control the inner dimensions of the bottle, the weight of the glass forming the bottle must be monitored.

The most common way that this is accomplished is for the machine operator to periodically remove a bottle from the glassware forming machine immediately after its formation. He then weighs the bottle and makes any adjustment necessary in the plunger stroke length. The bottle weighed must then be discarded, since the shape of the soft glass (temperature at this time is approximately 1000° F.) is invariably altered. Thus, the testing method most commonly used is destructive.

After a bottle has come out of the last mold of common glassware forming machines, a cooling wind must be played continuously over the bottle to prevent sag, an undesirable form of deformation. Another type of automatic bottle weighing system is known in which the bottle to be weighed is placed on a load cell soon after it emerges from the last mold of the glassware forming machine. To obtain an accurate measurement, the cooling wind must be shut off; however, doing so for even a short time may produce the above-mentioned deformation. By the time the bottle is cool, weight information would be too delayed to provide the desired degree of feedback control.

Determining the mass of the gob before it enters the scoop or gob distributor represents an improvement in the method of determining the mass of the bottle. Previous inventors have theorized that relatively small temperature changes in the molten glass do not result in material variances in the cross section of a gob emerging from the molten glass source, but will materially vary the length thereof and, as a consequence, will cause the weight of the gob formed during a predetermined time period to vary. U.S. Pats. to Grotta, No. 2,010,777, Henry et al, No. 1,941,552 and Wood et al, No. 1,898,705 all apply this discovery for controlling the weight of a gob. However, this method is unsatisfactory for several reasons. The circuitry and mechanical components necessary for such a method are complicated and expensive. In addition, the weight of the gob is not being determined directly. Variations in the width of the gob as a function of viscosity will affect the weight thereof.

U.S. Pat. Nos. 3,278,747 to Ohmart and 1,851,215 to Schunemann both disclose apparatus wherein a source of radiation is passed through the object to be weighed and the variation in the radiation transmitted through the object are used as an indication of variations in mass. The U.S. Pat. No. 3,443,651 to White discloses weighing apparatus for packaging machinery, wherein the material to be packaged is composed of a number of small objects which are dropped gradually onto the weighing apparatus until a predetermined weight is reached. The material then on the weighing apparatus may be packaged. Neither of the above methods would be suitable for weighing molten gobs of glass as they move between a source of molten glass and a glassware forming machine.

U.S. Pat. No. 1,820,508 to Sylvester for glass feeding apparatus discloses a weighing apparatus wherein the gob strikes a lever arm as it is falling from the source to the glassware forming machine. The angle by which the lever is displaced is proportional to the force with which the lever is struck, which, in turn, is a function of the mass of the gob. A number of problems exist with this system. The mechanics needed to convert the angular movement of the lever into the mass of the gob is complex and expensive. In addition, the degree to which the lever is swung is determined not by the force exerted on the lever by the gob, but the kinetic energy of the gob and the percentage of that energy transferred to the lever. The kinetic energy is dependent on the speed of the gob, which in turn is dependent upon its shape as it leaves the source and the distance it falls. The energy that is transferred from the gob to the lever is dependent on the shape of the gob and its viscosity. Thus, a large number of factors influence the degree to which the lever swings, thereby making the disclosed system prone to error.

The present application overcomes all of the problems in the prior art by positioning an acceleration detector and a force detector within a curved portion of a channel in which the object to be measured will pass. In the preferred embodiment, the curved channel is the scoop or gob distributor of a glassware forming system. The output of the acceleration detector is substantially proportional to the normal component of acceleration with respect to the path of the object, and the output of the force detector is representative of the force exerted as a result of this component of acceleration. The output of the acceration detector and the force detector are then combined so that the mass of the object may be determined. Thus, the present invention provides a simple and inexpensive method of determining the mass of a moving discrete object. Accurate results are obtained as a result of the simplicity in concept and design.

These and other objects and advantages of the invention will become more apparent and more readily appreciated from the following detailed description of the presently preferred exemplary embodiment of the invention taken in conjunction with the accompanying drawings, of which:

FIG. 2 is a schematic circuit diagram of one embodiment of the present invention; and FIG. 3 is a schematic circuit diagram of another embodiment of the present invention.

Figure 1:
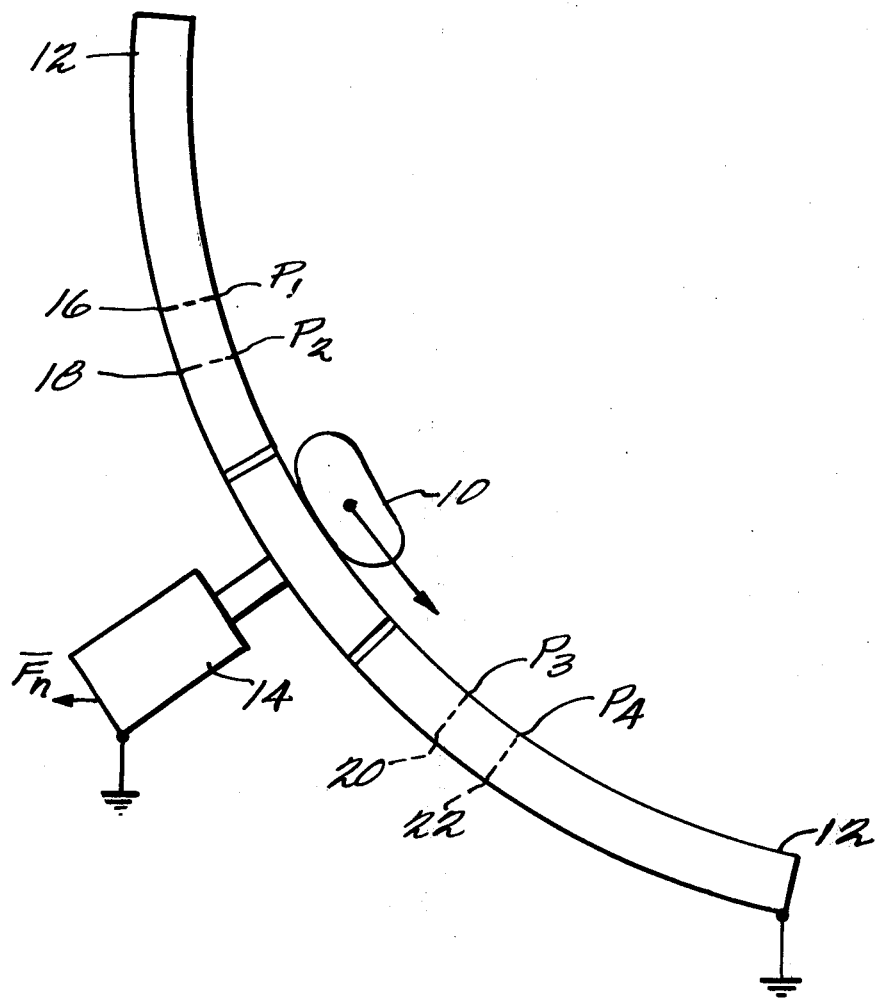
FIG. 1 is a schematic representation of the present invention.

Referring first to FIG. 1, gob 10 is produced by a source of molten glass (not shown) and falls vertically onto the upper portion of scoop 12. Gob 10 then follows the curved contour of scoop 12, during which time gob 10 is accelerating. Note that the acceleration along the curved section of scoop 12 has two components, one tangential and one normal to the path. The velocity of gob 10, as it first touches scoop 12, is:

$$\frac{ds}{dt} = gt_1 = V_o \quad (1)$$

where $t_1$ is the time it took gob 10 to fall from the source to scoop 12. In the curved portion of scoop 12 the velocity of gob 10 is:

$$\frac{ds}{dt} = V_o + (g\cos\theta)t \quad (2)$$

and the acceleration of gob 10 along the curved section is:

$$\bar{a} = \frac{d^2s}{2}\bar{e}_t - \frac{1}{r}(\frac{ds}{dt})^2\bar{e}_n \quad (3)$$

$$= (g\cos\theta)\bar{e}_t - \frac{(V_o + (g\cos\theta)t)^2}{r}\bar{e}_n$$

where $e_t$ and $e_n$ are unit vectors in the tangential and normal directions to the path of gob 10 and where r is the radius of the curved portion of scoop 12.

The normal force on gob 10 over the curved section of scoop 12 can be expressed as:

$$\bar{F}_n = m\bar{a}_n \quad (4)$$

where:

$$a_n = \frac{(V_o + (g\cos\theta)t)^2}{r} \quad (5)$$

Force sensor 14 inserted as a part of scoop 12 detects the normal component of the force exerted by gob 10, that is $\bar{F}_n$. Force detector 14 can be any such detector known in the art, but in the preferred embodiment is a load cell. The output of force detector 14, $F_n$, is supplied to computer 24 (FIGS. 2 and 3) which can be any computer well known in the art capable of measuring periods of time, storing data applied to it and performing basic mathematical functions.

Thus, if we can determine the normal component of acceleration of gob 10, the mass of gob 10 can be determined.

We know that:

$$a = \frac{dv}{dt} \approx \frac{\Delta V}{\Delta t} \quad (6)$$

Position indicators 16, 18, 20 and 22 determine the acceleration of gob 10. Although the position indicators such as indicator 16 could be any of the indicators known in the art, the preferred embodiment employs photoelectric cells that detect the moment gob 10 passes along scoop 12. Photoelectric cells 16 and 18 are positioned relatively close together on one side of force detector 14 while photocells 20 and 22 are positioned relatively close together on the other side of force detector 14. $P_1$, $P_2$, $P_3$ and $P_4$, the respective output of photocells 16, 18, 20 and 22, are also connected to computer 24.

As gob 10 passes cell 16, a clock in computer 24 is started, the output of which is used to increment a counter. As gob 10 passes cell 18, the counter is stopped. The information stored in the counter is the time for gob 10 to traverse the distance between cells 16 and 18. By knowing the distance between cells 16 and 18, the velocity between cells 16 and 18, hereafter referred to as $V_2$, can be determined. The same technique is used with cells 20 and 22 to determine the velocity between cells 20 and 22, hereafter referred to as $V_1$. $\Delta V$, in equation (6), then is $V_2-V_1$. $\Delta t$ is the time for gob 10 to traverse the distance between cell 18 and cell 20, which is also determined by computer 24.

Thus, by determining the time it takes gob 10 to traverse the distance between cells 16 and 18, cells 18 and 20, and cells 20 and 22, computer 24 has the data necessary to calculate the acceleration. Computer 24 can be used to calculate the mass:

$$m = \frac{F_n}{a} \quad \frac{F_n}{\left(\frac{\Delta V}{\Delta t}\right)} = \frac{F_n \Delta t}{V_2 - V_1} \quad (7)$$

Computer 24 can also determine whether the mass of gob 10 is larger or smaller than the mass of an ideal gob.

As illustrated in FIG. 2, translator and power supply 26 is responsive to the output signal from computer 24. Stepper motor 28 is controlled by the output of translator and power supply 26, and through gearbox 30 is attached to the gob weight shaft of the source of molten glass which controls the stroke of the plunger that forces the molten glass out of the source, and therefore controls the weight of the gob.

Alternatively, as illustrated in FIG. 3, a signal representing the mass of gob 10 may be supplied by computer 24 to digital to analog converter 32, output of which is one input to a differential amplifier 34. Driver 36, responsive to the output of amplifier 34 controls the operation of motor 38, which in turn connects to the gob weight shaft as described above. Motor 38, through gearbox 40, is also attached to potentiometer 42. The output of potentiometer 42 provides the other input to amplifier 34. Potentiometer 42 can be adjusted in order to calibrate the system.

Thus, employing the circuitry of either FIGS. 2 or 3, computer 24 can determine whether the mass of gob 10 is less than or greater than an ideal and control a motor to vary the mass of future gobs.

The method described above would give accurate results if the velocity function were linear. However, as is evident from equation (2), velocity is a cosine function. Also, the friction between gob 10 and scoop 12 has also been neglected. However, friction is an additive component of force and changes the tangential velocity. Friction is a function of time in that it increases as the scoop gets dirty. Therefore, it is better to not include the friction component in the calculations. If the actual velocity is measured, the correction for friction is automatic.

An alternative method of determining the velocity of gob 10 is to measure the velocity of gob 10 at several points and use computer 24 to perform a curve fitting routine. Computer 24 could then calculate the acceleration from the velocity function just as gob 10 passes force detector 14. However, for the application envisioned in the preferred embodiment, the increase in accuracy would not justify the great increase in complexity of the components.

The system as described above can be calibrated with a gob whose mass is known, e.g., by measuring the weight of a finished bottle as was the practice before the present invention.

Thus, the present invention offers the advantage of a closed feedback system that continually corrects for any changes in the mass of a gob without destroying the gob that is measured. The mass is also measured without any interference to the glassware forming machines as currently in use. Since the mass of the gobs is continually adjusted, no containers need to be discarded because of incorrect weight. Since the mass of the gobs varies slowly with time, the mass of every gob need not be determined. Experimentation reveals that the measurement of every sixth or tenth gob provides sufficient information in order to maintain the gob mass within conventional standards.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. Apparatus for measuring the mass of a moving object comprising:
   means for gradually changing the direction of movement of said object;
   force measuring means for measuring the force of said object normal to said direction of movement while said direction of movement is being changed;
   acceleration measuring means for measuring the acceleration of said object normal to said direction of movement; and
   means for interrelating the output of said force measuring means and said acceleration measuring means so as to determine the mass of said object.

2. Apparatus as in claim 1 wherein said direction changing means comprises a channeling means for routing said object to a proper location.

3. Apparatus as in claim 1 wherein said force measuring means is a load cell placed in said direction changing means so that said object passes over said load cell, and the surface of said load cell is coplanar with the surface of said direction changing means.

4. Apparatus for measuring the mass of a moving object comprising:
   means for altering the path of said object;
   force measuring means for measuring the force of said object normal to said path while said path is being altered;
   first and second position indicating means located in said path altering means on one side of said force measuring means, said second position indicating means being nearer said force measuring means than said first position indicating means;
   third and fourth position indicating means located in said path altering means on the other side of said force measuring means, said third position indicating means being nearer said force measuring means than said first position indicating means;
   computing means for determining the time taken by said object to move between said first and second position indicating means and said third and fourth position indicating means, for computing the velocity of said object on either side of said force measuring means, for determining the time taken by said object to move between said second and third position indicating means, and for computing a value of acceleration of said object substantially proportional to the component of acceleration normal to said path; and
   means for interrelating the output of said force measuring means and said computing means so as to determine the mass of said object.

5. Apparatus as in claim 4 wherein said first, second, third and fourth position indicating means are each photocells for producing a signal when said object enters the receptive field of said photocell.

6. Apparatus for measuring the mass of a moving gob of molten glass comprising:
   gob directing means for gradually changing the direction of movement of said gob;
   force measuring means for measuring the force of said gob normal to said direction of movement while said direction of movement is being changed;
   acceleration measuring means for measuring the acceleration of said gob normal to said direction of movement; and
   means for interrelating the output of said force measuring means and said acceleration measuring means so as to determine the mass of said gob.

7. Apparatus for measuring the mass of a moving gob of molten glass comprising:
   gob directing means for altering the path of said gob;
   force measuring means for measuring the force of said gob normal to said path while said path is being altered;
   first and second position indicating means located in said path altering means on one side of said force measuring means, said second position indicating means being nearer said force measuring means than said first position indicating means;
   third and fourth position indicating means located in said path altering means on the other side of said force measuring means, said third position indicating means being nearer said force measuring means than said first position indicating means;

computing means for determining the time taken by said object to move between said first and second position indicating means and said third and fourth position indicating means, for computing the velocity of said object on either side of said force measuring means, for determining the time taken by said object to move between said second and third position indicating means, and for computing a value of acceleration of said object substantially proportioned to the component of acceleration normal to said path; and means for interrelating the output of said force measuring means and said computing means so as to determine the mass of said gob.

8. Method for measuring the mass of a moving object comprising the steps of:
gradually changing the direction of movement of said object;
measuring the force of said object normal to said direction of movement while said direction of movement is being changed;
measuring the acceleration of said object normal to said direction of movement; and
interrelating said acceleration and force measurements so as to determine the mass of said object.

9. Method for measuring the mass of a moving object comprising the steps of:
altering the path of said object;
measuring the force of said object normal to said path while said path is being altered;
measuring the velocity of said object before and after said force measurement;
measuring the time between said velocity measurements;
calculating a value of acceleration of said object substantially proportional to the component of acceleration normal to said path; and
interrelating said acceleration and force measurements so as to determine the mass of said objects.

10. Method for measuring the mass of a moving gob of molten glass comprising the steps of:
altering the path of said gob;
measuring the force of said gob normal to said path while said path is being altered;
measuring the velocity of said gob both before and after said force measurement;
measuring the time between velocity measurements;
computing a value of acceleration of said gob from said velocity and time measurements substantially proportional to the component of acceleration normal to said path; and
interrelating said acceleration value and said force measurement so as to determine the mass of said gob.

11. In an apparatus for forming glassware wherein gobs of molten glass are directed at least partially by means of a curved channel from a source of molten glass to a glassware forming machine, the improvement being apparatus for measuring the mass of said gobs comprising:

force measuring means for measuring the force of said gob normal to the path of said gob while said gob is moving in said curved channel;
means for measuring the velocity of said gob on both sides of said force measuring means;
means for measuring the time it takes said gob to travel between said means for measuring velocity; and
computing means for calculating a value of acceleration of said gob from the output of said velocity measuring means and time measuring means substantially proportional to the component of acceleration normal to said path and for interrelating said acceleration value and the output of said force measuring means so as to determine the mass of said gob.

12. Apparatus for measuring the mass of a moving object comprising:
means for gradually changing the direction of movement of said object;
force measuring means for measuring the force of said object normal to said direction of movement while said direction of movement is being changed;
first velocity measuring means disposed in said direction changing means on one side of said force measuring means for measuring the velocity of said object normal to said direction of movement;
second velocity measuring means disposed in said direction changing means on the other side of said force measuring means for measuring the velocity of said object normal to said direction of movement;
computing means for determining the time taken by said object to move between said first and second velocity measuring means, for determining a value of acceleration of said objects substantially proportional to the component of acceleration normal to said direction of movement; and
means for interrelating the output of said force measuring means and said computing means so as to determine the mass of said object.

13. Apparatus for measuring the mass of a moving gob of molten glass comprising:
gob directing means for altering the path of said gob;
force measuring means for measuring the force of said gob normal to said path while said path is being altered;
first velocity measuring means disposed in said path altering means on one side of said force measuring means for measuring the velocity of said gob normal to said path;
second velocity measuring means disposed in said path altering means on the other side of said force measuring means for measuring the velocity of said gob normal to said direction of movement;
computing means for determining the time taken by said object to move between said first and second velocity measuring means for determining a value of acceleration of said objects substantially proportional to the component of acceleration normal to said path; and
means for interrelating the output of said force measuring means and said computing means so as to determine the mass of said gob.

* * * * *